(12) United States Patent
Underwood et al.

(10) Patent No.: US 11,452,655 B2
(45) Date of Patent: Sep. 27, 2022

(54) INFANT WARMING SYSTEM AND METHOD

(71) Applicant: General Electric Company, Schenectady, NY (US)

(72) Inventors: Thomas Charles Underwood, Sykesville, MD (US); Steven Mitchell Falk, Baltimore, MD (US); Karen P. Starr, Monkton, MD (US); Michelle Dowell, Derwood, MD (US)

(73) Assignee: General Electric Company, Schenectady, NY (US)

( * ) Notice: Subject to any disclaimer, the term of this patent is extended or adjusted under 35 U.S.C. 154(b) by 426 days.

(21) Appl. No.: 16/436,561

(22) Filed: Jun. 10, 2019

(65) Prior Publication Data

US 2019/0290522 A1    Sep. 26, 2019

Related U.S. Application Data

(62) Division of application No. 15/635,927, filed on Jun. 28, 2017, now Pat. No. 10,596,054.

(51) Int. Cl.
*A61G 11/00* (2006.01)
*G01K 3/14* (2006.01)
(Continued)

(52) U.S. Cl.
CPC ............ *A61G 11/00* (2013.01); *A61G 11/003* (2013.01); *G01K 3/10* (2013.01); *G01K 3/14* (2013.01);
(Continued)

(58) Field of Classification Search
CPC .. A61G 11/00; A61G 11/003; A61G 2203/46; A61G 2210/90; A61G 2203/20;
(Continued)

(56) References Cited

U.S. PATENT DOCUMENTS 3,789,853 A    2/1974 Reinhard
3,872,726 A *  3/1975 Kauffeld ................. G01K 7/42
                                              374/169
(Continued)

FOREIGN PATENT DOCUMENTS

EP           213407 A2 * 11/1987

OTHER PUBLICATIONS

Dragerwerk AG & Co., "The Caleo Effect", Communications & Sales Marketing, 15.06-3, 2015.
(Continued)

*Primary Examiner* — Navin Natnithithadha
*Assistant Examiner* — Sunita Reddy
(74) *Attorney, Agent, or Firm* — Andrus Intellectual Property Law, LLP

(57) ABSTRACT

An infant warming system includes a body temperature probe, a peripheral temperature probe, and at least two identical input jacks, each input jack configured to receive either one of the first connector or the second connector. The body temperature probe has a body temperature sensor removably fixable to an infant's torso to measure a body temperature of the infant, and a first connector configured to connect to an input jack to transmit the body temperature measurement. The peripheral temperature probe includes a peripheral temperature sensor removably fixable to the infant's extremity to measure a peripheral temperature of the infant, and a second connector configured to connect to an input jack to transmit the peripheral temperature measurement. The system further includes a probe detection module to automatically detect whether each input jack is connected to the peripheral temperature probe or the body temperature probe.

17 Claims, 8 Drawing Sheets

(51) Int. Cl.
*G01K 3/10* (2006.01)
*G01K 7/24* (2006.01)
*G01K 13/00* (2021.01)
*G01K 13/20* (2021.01)

(52) U.S. Cl.
CPC .............. *G01K 7/24* (2013.01); *G01K 13/20* (2021.01); *A61G 2203/20* (2013.01); *A61G 2203/46* (2013.01); *A61G 2210/90* (2013.01)

(58) Field of Classification Search
CPC G01K 13/20; G01K 3/10; G01K 7/24; G01K 3/14
USPC ....................................................... 600/21–22
See application file for complete search history.

(56) References Cited

U.S. PATENT DOCUMENTS

| | | | |
|---|---|---|---|
| 4,276,888 A | 7/1981 | Smith et al. | |
| 4,294,263 A | 10/1981 | Hochman | |
| 4,295,475 A | 10/1981 | Torzala | |
| 4,399,824 A | 8/1983 | Davidson | |
| 4,695,955 A * | 9/1987 | Faisandier | A61B 5/30 600/300 |
| 5,043,692 A * | 8/1991 | Sites | G01K 7/24 338/28 |
| 5,139,744 A * | 8/1992 | Kowalski | G01N 35/028 422/63 |
| 5,385,529 A * | 1/1995 | Koch | A61G 11/00 600/22 |
| 5,623,925 A * | 4/1997 | Swenson | A61B 5/0205 600/483 |
| 6,220,750 B1 | 4/2001 | Palti | |
| 6,409,654 B1 | 6/2002 | McClain | |
| 6,893,390 B1 | 5/2005 | Mackin | |
| 2001/0020123 A1* | 9/2001 | Diab | G01J 3/0275 600/323 |
| 2004/0076215 A1 | 4/2004 | Baumbach | |
| 2008/0091097 A1 | 4/2008 | Linti et al. | |
| 2009/0149927 A1* | 6/2009 | Kneuer | G05D 23/00 607/96 |
| 2011/0249701 A1 | 10/2011 | Bieberich et al. | |
| 2011/0264001 A1 | 10/2011 | Cheung et al. | |
| 2013/0341315 A1 | 12/2013 | Blank et al. | |
| 2014/0076887 A1* | 3/2014 | Toh | H05B 6/06 219/667 |
| 2014/0245783 A1 | 9/2014 | Proud et al. | |
| 2015/0182406 A1* | 7/2015 | Falk | A61F 7/10 600/22 |
| 2015/0201846 A1* | 7/2015 | Maiershon | A61B 5/6803 600/301 |
| 2015/0335510 A1* | 11/2015 | Cipriano | A61G 11/009 600/22 |
| 2016/0003686 A1* | 1/2016 | Matsumoto | G01F 25/10 374/1 |

OTHER PUBLICATIONS

Dragerwerk AG & Co., "Closer to the ideal", Communications & Sales Marketing, 15.06-2, 2015.

* cited by examiner

INFANT WARMING SYSTEM AND METHOD

CROSS REFERENCE TO RELATED APPLICATION

This application is a divisional of U.S. patent application Ser. No. 15/635,927, filed Jun. 28, 2017, which is incorporated herein by reference in entirety.

BACKGROUND

The present disclosure relates to infant warming systems, such as incubators and radiant warmers, and more specifically to systems and methods for controlling temperature inside an infant incubator or other warming system.

Some infants and especially some prematurely born infants at birth are not physiologically well enough developed to be able to survive without special medical attention. A frequently used medical aid for such infants is the incubator. The primary objective of the incubator is to provide an environment which will maintain the infant at a minimum metabolic state thereby permitting as rapid physiological development as possible.

Currently available incubators generally utilize two different approaches for maintaining temperature inside the incubator. One approach employs a thermostat control to measure the air temperature inside the incubator and turn on or turn off a heater, such as an air heater, in response to changes in the air temperature within the incubator at a constant value. This approach, however, does not provide any control over the infant's temperature. Another approach is an incubator temperature control system that includes a temperature sensor to measure infant skin temperature. The heater is then controlled based on the measured skin temperature of the infant in order to maintain the skin temperature within a predetermined range.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, an infant warming system includes a body temperature probe, a peripheral temperature probe, and at least two identical input jacks, each input jack configured to receive either one of the first connector or the second connector. The body temperature probe has a body temperature sensor removably fixable to an infant's torso to measure a body temperature of the infant, and a first connector configured to connect to an input jack to transmit the body temperature measurement. The peripheral temperature probe includes a peripheral temperature sensor removably fixable to the infant's extremity to measure a peripheral temperature of the infant, and a second connector configured to connect to an input jack to transmit the peripheral temperature measurement. The system further includes a probe detection module automatically detecting whether each input jack is connected to the peripheral temperature probe or the body temperature probe.

One embodiment of a method of operating an infant warming system having two identical input jacks each configured to alternatively receive a connector of a peripheral temperature probe or a connector of a body temperature probe, includes receiving a connector of a first temperature probe in the first input jack, and then determining a first resistance and a second resistance for the first temperature probe. At least one of the first resistance and the second resistance are then compared to a predetermined range of a fixed resistance value. The first temperature probe is determined to be the peripheral temperature probe when one of the first resistance or the second resistance is within the predetermined range of the fixed resistance value. A peripheral temperature for the infant is then determined based on the remaining one of the first resistance or the second resistance that is not within the predetermined range of the fixed resistance value.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

The present inventors have recognized a need for an infant warming system providing multiple identical input jacks for receiving skin temperature sensing probes—which may be, for example, one peripheral temperature probe and one body temperature probe or two body temperature probes—wherein the system can detect and automatically differentiate between the two sensor types. The inventors have recognized that the system can be configured to provide a flexible care environment, where the identical input jacks can be used to either receive temperature measurements from two different body temperature sensors attached to two separate infants (such as twins sharing the same incubator), or to receive temperature measurements from two different locations on a single infant, such as a body temperature and a peripheral temperature from one infant. Accordingly, each of the input jacks is configured to connect to and receive either one of a body temperature probe or a peripheral temperature probe. Beneficially, the infant warming system includes a probe detection module associated with each of the input jacks to automatically detect whether each input jack is connected to a peripheral temperature probe or a body temperature probe. Thereby, the infant warming system can ensure that temperature control of the microenvironment is not mistakenly controlled based on peripheral temperature measurements from a peripheral temperature probe, instead of body temperature measurements, which could lead to overheating the infant.

In an embodiment where a body temperature probe is measuring a body temperature of the infant and a peripheral temperature probe is simultaneously measuring a peripheral temperature of the infant, a temperature differential between the body temperature and peripheral temperature may be monitored and tracked. The temperature differential and/or the peripheral temperature may be utilized to provide early detection of temperature stress on the infant, as the peripheral temperature of the infant will change before the body temperature changes due to an environment that is either too hot or too cold. Accordingly, the temperature within the infant warming system may be controlled to maintain the body temperature within a desired temperature range, as well as to maintain the temperature differential between the body temperature and the peripheral temperature within an ideal differential range. A heat stress alert or cold stress alert may be generated if the temperature differential is below or above, respectively, the ideal differential range.

Figure 1A:
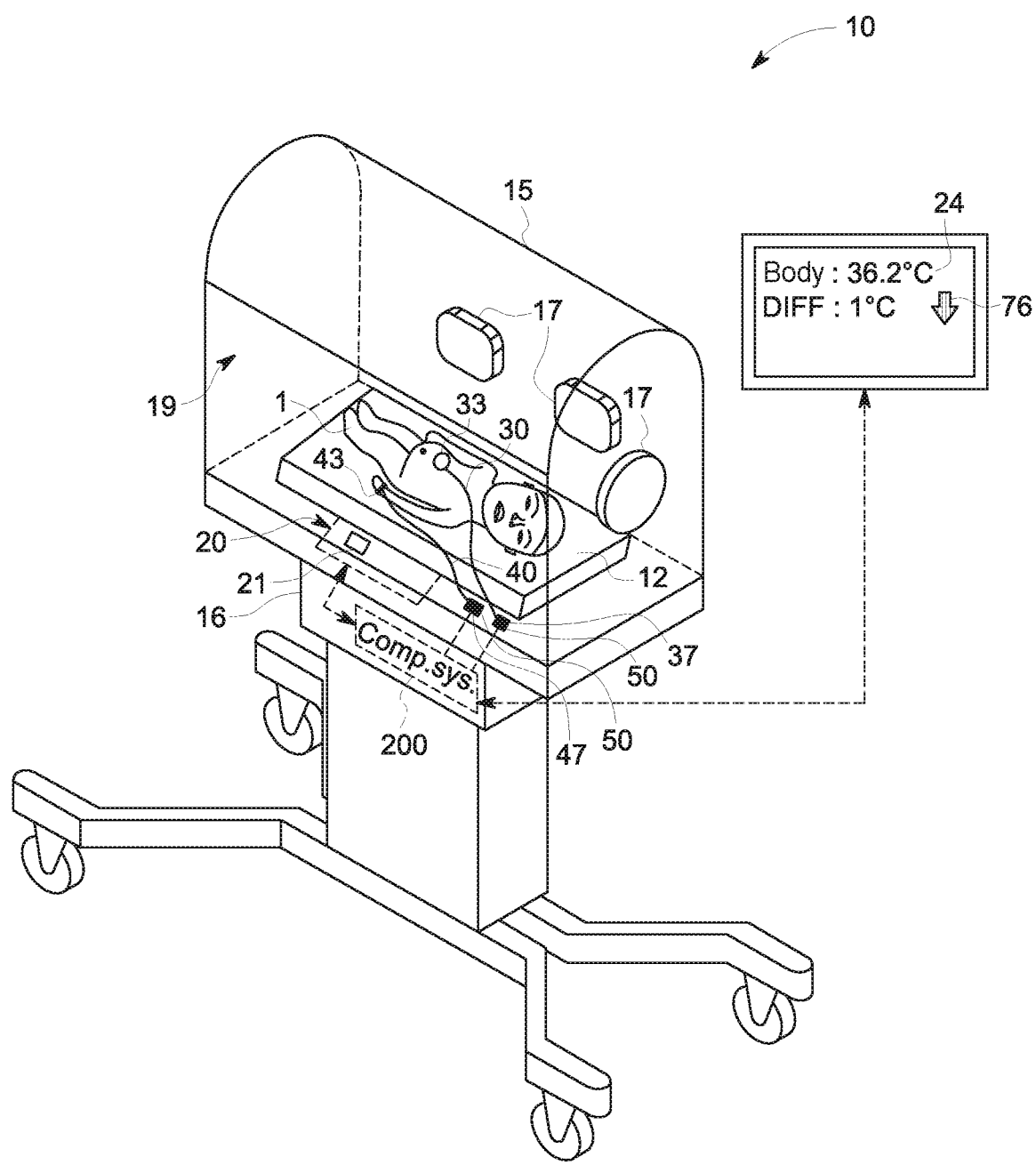
FIGS. 1A and 1B provide exemplary infant warming systems according to the present disclosure.
Figure 1B:
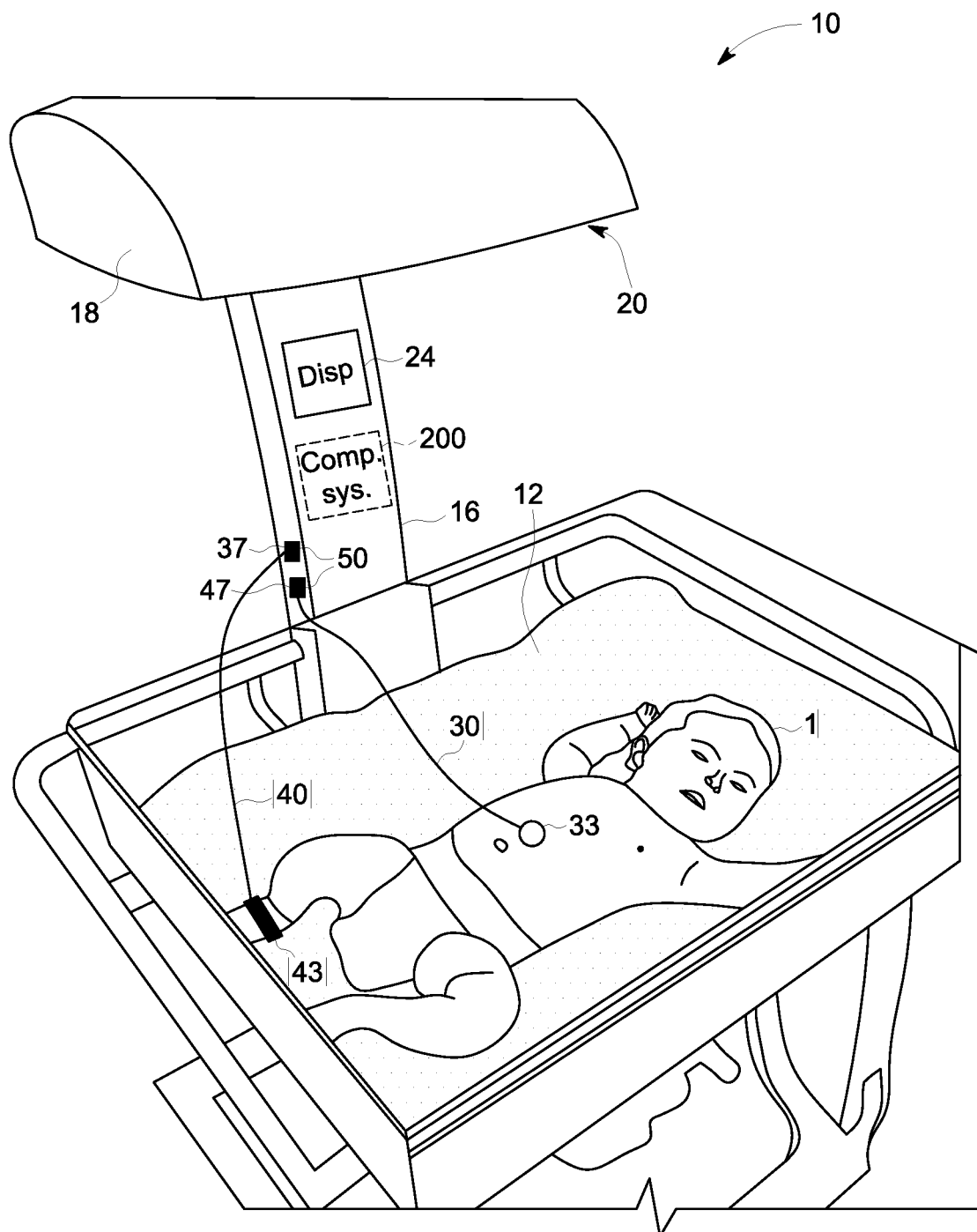

FIGS. 1A and 1B depict exemplary infant warming systems 10. FIG. 1A depicts an incubator system for an infant 1, and FIG. 1B depicts an infant radiant warmer, each of which are exemplary infant warming systems 10 having heater systems 20 providing a heated environment for the infant 1. In the examples, the system 10 includes a body temperature probe 30 removably fixed to the infant's torso, such as to the infant's abdomen, to measure a body temperature of the infant 1, and includes a peripheral temperature probe 40 removably fixed to the infant's extremity to measure a peripheral temperature of the infant 1. Each temperature probe 30, 40 has a respective temperature sensor 31, 41 portion thermally contacting and detecting a temperature at a particular location on the infant's skin. In the particular embodiment, the body temperature probe 30 comprises an adhesive connection pad 33 adhering the body temperature sensor 31 to the skin of an infant's torso, such as above the infant's liver. In the depicted embodiment, the peripheral temperature probe 40 has a fixation band 43 fixing the peripheral temperature sensor 41 to the infant's hand. In the example of FIG. 2, the peripheral temperature sensor 41 is attached to the infant's foot. As will be understood by one of ordinary skill in the art in light of the disclosure, the peripheral temperature sensor 41 may be fixed at any location on the infant's extremity—such as their hand, foot, wrist, ankle, or at another location on one of the patient's extremities appropriate for taking a peripheral temperature measurement from the infant 1. Various embodiments of the temperature probes 30, 40 are described and depicted herein below.

The temperature probes 30, 40 each include a respective connector 37, 47 for connecting to the system 10 so that the temperature measurements may be transmitted thereto. The connectors 37, 47 each connect to one of two identical input jacks 50 (see FIG. 4). The input jacks provide measurement information received from the temperature probes 30, 40 to a computing system 200, which receives, displays, and stores the temperature information measured from the infant. The computing system 200 includes software that processes the measurements from the respective temperature probes 30, 40 to control various aspects of the system. The computing system 200 may include a probe detection module, which is a set of software instructions configured to detect whether each input jack 50 is connected to a peripheral temperature probe or a body temperature probe so that the temperature measurements can be properly tracked and utilized. In the exemplary incubator system of FIG. 1A, the incubator system 10 includes a platform 12 supporting the infant 1. A canopy 15 is provided over the platform 12 to form a microenvironmental chamber 19 providing a controlled environment isolated from the surrounding environment. The canopy 15 has access portals 17 to facilitate access to the infant 1 without significantly altering the microenvironment within the chamber 19. The canopy 15 is supported on a support structure 16, or frame, that houses and supports control systems for controlling aspects of the microenvironment within the chamber 19, including the heater system 20, as well as other systems for controlling humidity, air flow, etc. within the chamber 19. The support structure 16 may also house a control system for coordinating and controlling the various warming and other environmental control systems, including the heater system 20, as well as for monitoring the condition of the infant. As will be appreciated by a person having ordinary skill in the art, in addition to the temperature probes 30, 40 one or more sensors may be configured to measure physiological parameters from the infant 1, such as cardiac activity, blood oxygen level, or other vital signs. Such vital sign information, including temperature measurements from the temperature probes 30, 40 may be received by the computing system 200, which comprises software to process such vital sign measurements to monitor the condition of the infant 1. Vital sign information may be stored on computer memory within a storage system 204 within the computing system 200, and/or may be transmitted to a central network of a healthcare facility. Such vital sign information may also be displayed on a display 24 associated with the incubator system 10.

Referring still to FIG. 1, the computing system 200 may further comprise software for controlling the heater system 20 to maintain the chamber 19 at a particular temperature to maximize comfort of the infant 1. In one embodiment, the computing system 200 may include software to operate and control the heater system 20 in one of two modes, either in an infant mode based on the temperature of the infant 1 or in an air mode based on the air temperature within the microenvironment of the chamber 19. In an infant control mode, the heater system 20 may be controlled by using the body temperature of the infant 1, as measured by the body temperature probe 30, as feedback. In an air control mode, the heater system 20 may be controlled based on an air temperature of the air circulating in the chamber 19, such as a temperature measurement by one or more temperature sensors 21 measuring an air temperature representative of the temperature experienced by the infant 1.

As will be appreciated by one skilled in the art, the heating system 20 may be a convective heating system using force convective air, which may include one or more heaters, fans, and air ducts to circulate and control the air within the chamber 19. In certain embodiments, the heating system 20 may also include or be associated with a humidifier to control the humidity within the chamber 19.

FIG. 1B depicts another exemplary infant warming system 10 being a radiant infant warmer. The radiant infant warmer system 10 incorporates many of the same elements, aspects, and systems described above with respect to FIG. 1A. However, the radiant infant warmer does not provide an enclosed chamber and instead provides a hood 18 suspended over the infant platform 12 housing a heater system 20 that is a radiant heating system. The radiant heater that directs infrared energy toward the infant 1 in order to provide a heated environment for the infant 1. As described with respect to the incubator system embodiment, the radiant warmer also includes two identical input jacks to receive connectors 37, 47 of two temperature probes, which may be two body temperature probes 30 connected to two different infants, or may be one body temperature probe 30 and one peripheral temperature probe 40 connected to a single infant 1. In the depicted example, the peripheral temperature probe 40 has a temperature sensor attached to the infant's foot via fixation band 43. In other embodiments, the temperature sensors of the temperature probes 30, 40 may be attached to the infant's skin by any of various means, examples of which are described herein below.

Figure 2A:
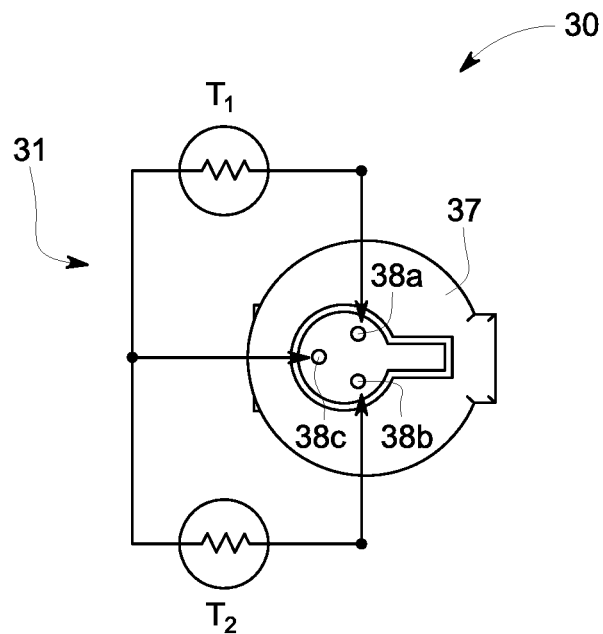
FIGS. 2A and 2B schematically depict temperature probes according to the present disclosure.
Figure 2B:
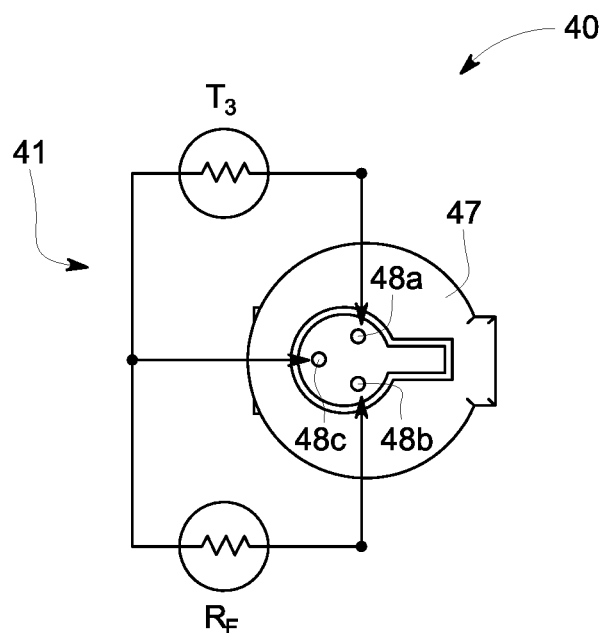

FIG. 2A schematically depicts one embodiment of the temperature sensor 31 of the body temperature probe 30. FIG. 2B schematically depicts an exemplary embodiment of the temperature sensor 41 of the peripheral temperature probe 40. In the depicted embodiments, each of the body temperature probe 30 and the peripheral temperature probe 40 include two resistors, the resistance of which is determined with respect to a common return. As depicted in the embodiment of FIG. 2A, the temperature sensor 31 at the tip of the body temperature probe 30 comprises two thermistors $T_1$ and $T_2$ used to measure the skin temperature of the infant. In one embodiment, the thermistors $T_1$ and $T_2$ are identical thermistors have a thermistor resistance range of 15,799.1Ω to 4,329.1Ω, which corresponds to a temperature range of 15° C. to 45° C., respectively. In other embodiments, the thermistors $T_1$ and $T_2$ may have a different resistance range, and the upper and lower bounds of the temperature range may also vary while remaining appropriate for sensing temperature of the infant. Assuming proper function of the thermistors $T_1$ and $T_2$, the measured temperatures should be identical, or very close to one another and within an error range of the sensor. Provision of the two thermistors $T_1$ and $T_2$ provides fault detection where the two temperature measurements differ by more than a predefined threshold. In one embodiment, the body temperature measurement from one of the thermistors $T_1$ and $T_2$ may be used for displaying the temperature on a display 24 and/or storing the body temperature for the infant at a particular time, and the body temperature measurement from the other thermistors $T_1$ and $T_2$ may be utilized for providing temperature feedback for controlling the heater system 20. In still other embodiments, the measurements from both thermistors $T_1$ and $T_2$ may be utilized to determine the body temperature, assuming proper operation of both thermistors $T_1$ and $T_2$, such as by taking an average of the two measurements.

Specifically, the resistance of each thermistor $T_1$ and $T_2$ is determined by measuring a voltage drop across the respective thermistor $T_1$ and $T_2$. In the depicted embodiment, the connector 37 of the body temperature probe 30 includes three contact points 38a-38c that connect to contact points in the input jacks 50. According to the arrangement in the depicted schematic, the resistance of the first thermistor $T_1$ is determined by measuring a voltage differential between contact point 38a and the contact point 38c for the common return. Similarly, the resistance the second thermistor $T_2$ is determined by measuring the voltage differential across contact points 38b and 38c.

FIG. 2B schematically depicts a corresponding embodiment of the peripheral temperature sensor 41 for the peripheral temperature probe 40. The connector 47 of the peripheral temperature probe 40 is identical to the connector 37 of the body temperature probe, and thus the connectors 37, 47 can be interchanged in the input jacks 50. The peripheral temperature sensor also includes a thermistor $T_3$ by which a skin temperature of the infant is measured. In one example, the thermistor $T_3$ may have the same resistance range and corresponding temperature range as described above with respect to thermistors $T_1$ and $T_2$. However, the peripheral temperature sensor 41 includes a fixed resistor $R_F$ instead of a second thermistor. The fixed resistor may be provided in the probe head, or tip, of the temperature sensor 41, similar to the arrangement of the body temperature sensor 31. Alternatively, the fixed resistor $R_F$ may be provided at another location within the peripheral temperature probe 40, as the fixed resistor $R_F$ does not need to be in thermal contact with the infant's skin.

The fixed resistor preferably has a predetermined resistance that is outside of the resistance range of the thermistor $T_3$, and thus the peripheral temperature probe can be easily identified based on detection of the predetermined fixed resistance value of the fixed resistor $R_F$. Similar to the description above, the resistance determination is made upon connection of the connector 47 to an input jack 50 of the system 10, and is periodically measured thereafter. The resistance of the thermistor $T_3$ is measured based on a voltage differential between contact point 48a and 48c. The peripheral temperature is then determined based on the resistance of the thermistor $T_3$. The resistance of the fixed resistor $R_F$ is determined based on a voltage differential between contact points 48b and 48c. To provide just one exemplary embodiment, the resistance value of the fixed resistor $R_F$ may be 2,000Ω, which is well below the resistance range of the thermistors $T_1$, $T_2$, $T_3$. In other embodiments, the fixed resistor value may be higher or lower, but preferably is outside the resistance range of the thermistors $T_1$, $T_2$, $T_3$ so that it can be reliably differentiated therefrom. The peripheral temperature probe 40 may then be detected, for example by detecting a resistance within a predetermined range of the fixed resistance value. To provide just one example, the predetermined range may be a percentage above and below the fixed resistance value, such as within +/−10% of the predetermined fixed resistance value for the fixed resistor $R_F$.

Figure 3:
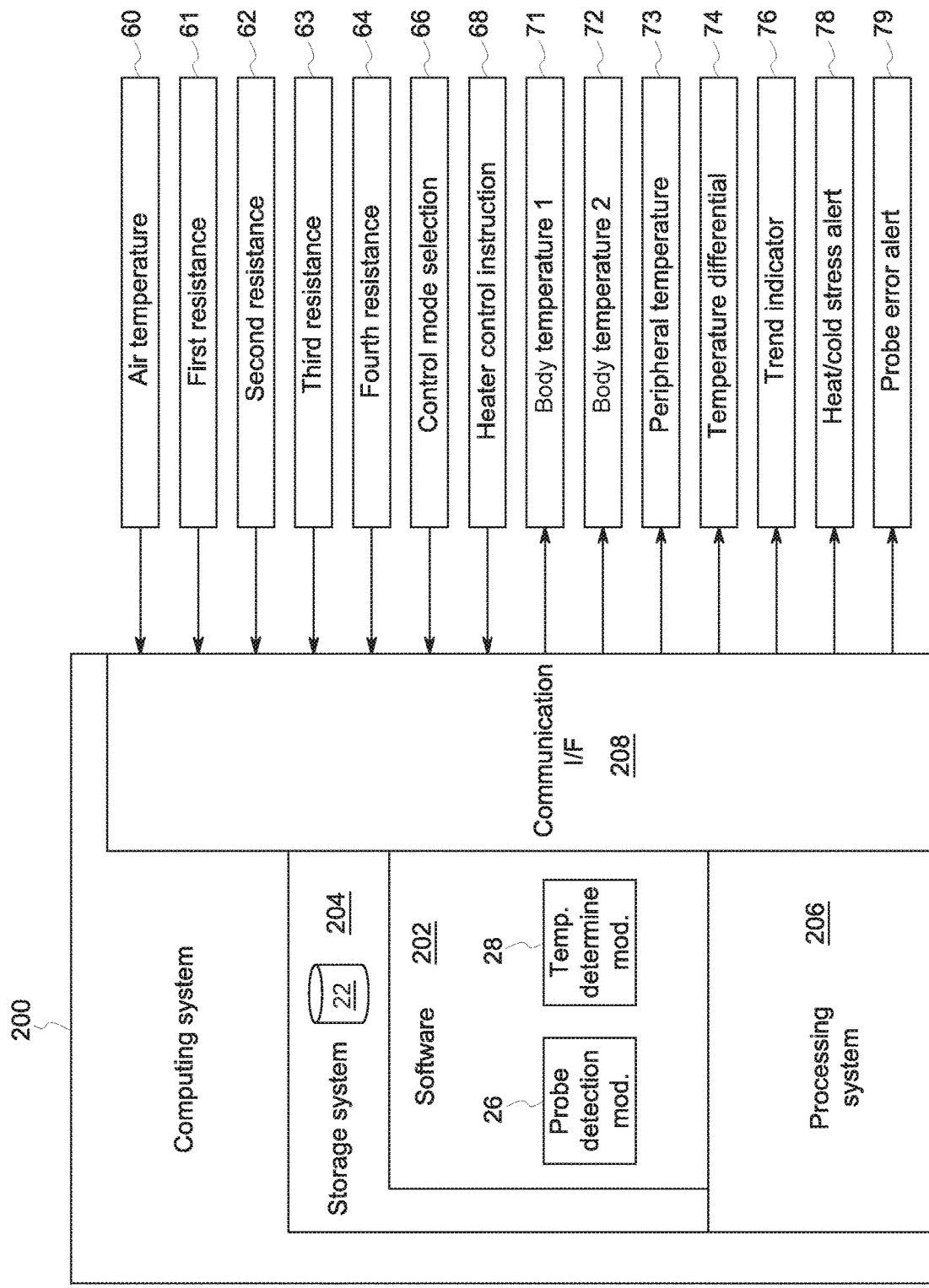
FIG. 3 schematically depicts an exemplary computing system associated with an infant warming system.

FIG. 3 provides a schematic diagram of an exemplary computing system 200 associated with or comprised in an infant warming system 10 that operates as described herein. The computing system 200 comprises a processing system 206, storage system 204, software 202, and a communication interface 208. The processing system 206 loads and executes software 202 from the storage system 204, including a probe detection module 26 and a temperature determination module 28, which are applications within the software 202. Each of the modules 26 and 28 include computer-readable instructions that, when executed by the computing system 200 (including the processing system 206), direct the processing system 206 to operate as described in herein in further detail.

Although the computing system 200 as depicted in FIG. 3 includes one software 202 encapsulating one probe detection module 26 and one temperature determination module 28, it should be understood that the operations may be divided among one or more software systems and modules. Similarly, while description as provided herein refers to a computing system 200 and a processing system 206, it is to be recognized that implementations of such systems can be performed using one or more processors, which may be communicatively connected, and such implementations are considered to be within the scope of the description.

The processing system 206 includes a processor, which may be a microprocessor, a general purpose central processing unit, an application-specific processor, a microcontroller, or any other type of logic-based device. The processing system 206 may also include circuitry that retrieves and executes software 202 from storage system 204. Processing system 206 can be implemented within a single processing device but can also be distributed across multiple processing devices or sub-systems that cooperate in executing program instructions.

The storage system 204, which includes the infant records database 22, can comprise any storage media, or group of storage media, readable by processing system 206, and capable of storing software 202. The storage system 204 can include volatile and non-volatile, removable and non-removable media implemented in any method or technology for storage of information, such as computer-readable instructions, data structures, program modules, or other data. Storage system 204 can be implemented as a single storage device but may also be implemented across multiple storage devices or sub-systems. For example, the software 202 may be stored on a separate storage device than the infant records database 22. Likewise, infant records database 22 can be stored, distributed, and/or implemented across one or more storage media or group of storage medias. Similarly, infant records database 22 may encompass multiple different sub-databases at different storage locations and/or containing different information which may be stored in different formats. Storage system 204 can further include additional elements, such a controller capable of communicating with the processing system 206.

Examples of storage media include random access memory, read only memory, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. Likewise, the storage media may be housed locally with the processing system 206, or may be distributed in one or more servers, which may be at multiple locations and networked, such as in cloud computing applications and systems. In some implementations, the storage media can be a non-transitory storage media. In some implementations, at least a portion of the storage media may be transitory.

The communication interface 208 interfaces between the elements within the computing system 200 and external devices, such as to receive the resistance values and/or corresponding temperature values obtained from the temperature probes 30, 40. Likewise, the computing system may interact with user interface devices, such as to provide control instructions to the display 24 and to receive input from one or more user input devices for controlling the function of the system 10. The computing system 200 may receive a control mode selection 66 from a user interface, such as a selection between air control mode and infant control mode for controlling the heater system 20, and may comprise software to calculate and output a heater control instruction 68 accordingly based on the one or more temperature measurement inputs. In one example, the display 24 may be a touch screen comprising the user input device whereby the user inputs the control mode selection 66. In air control mode, the control software determines heater control instruction 68 based on the air temperature measurements 60 from the air temperature sensor 21. In infant control mode, the control software may determine the control instructions based on one or more body temperature measurements of the infant.

In order to ensure that the heating system 20 is controlled based on body temperature measurements, rather than peripheral temperature measurements, the software includes the probe detection module 26 to differentiate between body temperature probes 30 and peripheral temperature probes 40 based on the received resistance values 61-64, as is described herein. For example, a peripheral temperature probe 40 is detected if any of the resistance values 61-64 are within the predetermined range for the fixed resistor $R_F$. Accordingly, the peripheral temperature measurements based on the other resistance value from that probe will be identified as a peripheral temperature measurement 73 and will not be utilized as feedback for controlling the heater system 20.

Furthermore, the probe detection module 26 may be configured to generate a probe error alert 79 (such as a visual alert on the display 24 and/or an audio alert via a speaker associated with the system 10 and/or a central monitoring station) to alert a clinician to an error with the temperature probes 30, 40. A probe error may be detected, for example, if two peripheral temperature probes 40 are detected and no body temperature probe 30 is detected. As another example, a probe error may also be detected where the peripheral temperature measurement is greater than or equal to the body temperature measurement, as that is a possible indicator that the temperature probes 30, 40 have been misplaced, or switched, on the infant—e.g., that a body temperature probe 40 has been accidentally placed on the extremity of the infant 1, and/or that a peripheral temperature probe 40 has been placed on the infant's core.

Once the temperature probes 30 and 40 are identified, the temperature determination module 28 determines a body temperature and a peripheral temperature for the infant 1. In the embodiments depicted herein, the temperature determination module 28 determines a first body temperature 71 and a second body temperature 72 based on the two resistance values of the thermistors $T_1$ and $T_2$ of the body temperature probe 30. A peripheral temperature 73 is also determined based on the resistance of the single thermistor $T_3$ in the peripheral temperature probe 40. A temperature differential 74 is then determined based on a comparison between the first body temperature and/or the second body temperature 72 with the peripheral temperature 73.

The temperature determination module 28 may also be configured to determine a temperature differential trend based on the temperature differential values 74 calculated over time. A trend indicator 76 may then be produced based on the temperature differential trend. Referring to FIG. 1A, for example, the trend indicator 76 for the temperature differential 74 is exemplified on the exemplary display 24. The trend indicator 76 may take any form that visually indicates the trend of the temperature differential 74, such as the change in the temperature differential 74 value over a predetermined time period. In the depicted embodiment, the trend indicator 76 is exemplified as a downward-pointing, red colored arrow, indicating that the temperature differential 74 is decreasing—meaning that the peripheral temperature may be increasing and the infant may be experiencing early stages of heat stress. Depending on the value of the body temperature 71, 72 and peripheral temperature 73, as well as the temperature differential 74, the trend indicator 76 may provide an early warning of either heat stress or cold stress.

The temperature determination module 28 may also be configured to generate a heat stress and/or cold stress alert 78 based on the temperature differential 74 and/or the trend indicator 76. For example, the heat/cold stress alert 78 may be generated if the temperature differential falls outside of an ideal differential range. Specifically, a heat stress alert may be generated if the temperature differential is below the ideal differential range, and a cold stress alert may be generated if the temperature differential is above the ideal differential range. Alternatively or additionally, the heat/cold stress alerts 78 may be generated based on the trend indicator 76. For example, if the peripheral temperature 73 and/or temperature differential 74 is nearing a heat stress threshold and the trend indicator is indicating that the temperature differential 74 is decreasing then the heat stress alert 78 or a heat stress warning may be generated to provide an early warning of heat stress. Similarly, if the peripheral temperature 73 and/or temperature differential 74 is nearing a cold stress threshold and the trend indicator 76 is indicating that the temperature differential 74 is decreasing, then a cold stress alert 78 or cold stress warning may be generated as an early warning sign of cold stress. In various embodiments, the heat/cold stress alerts 78 may include audio and/or visual alerts via one or more user interfaces associated with the system 10.

Figure 4:
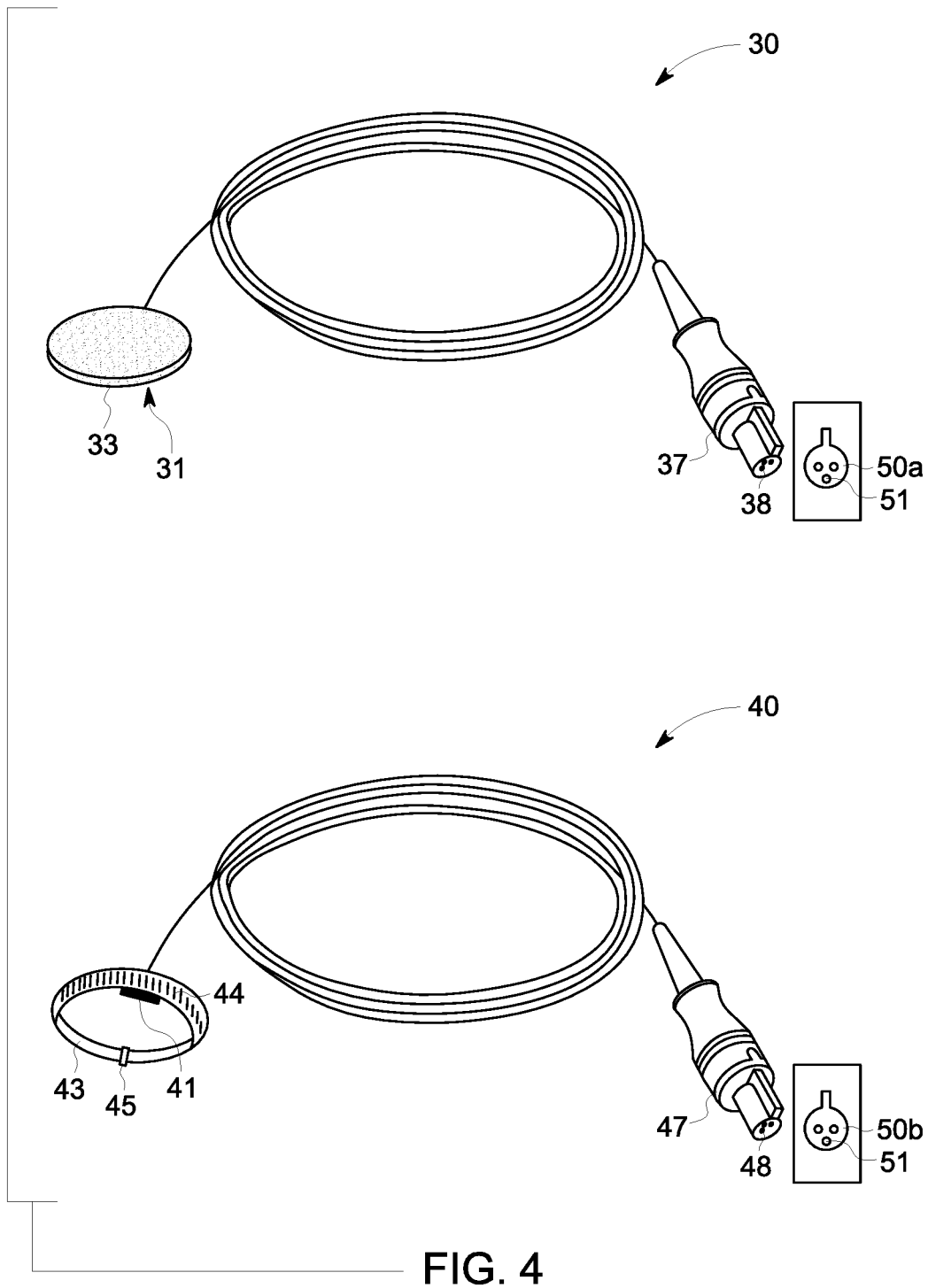
FIGS. 4 and 5 depict exemplary embodiments of temperature probe sets.

FIG. 4 depicts exemplary embodiments of a body temperature probe 30 and a peripheral temperature probe 40 which are each connectable to either of the identical input jacks 50a and 50b. In the depicted embodiment, the connectors 37 and 47 of the temperature probes 30 and 40 are identically configured, each having three connection points 38, 48 that connect with the three contact ports 51 in either of the input jacks 50a or 50b. In the depicted embodiment, the body temperature probe 30 and the peripheral temperature probe 40 are visually distinguishable based on the means for attaching the respective temperature sensors 31, 41 to the infant. Namely, the body temperature probe 30 includes a connection pad 33 with a temperature-conducting adhesive surface that adheres the body temperature sensor 31 to the infant's torso. The peripheral temperature probe 40 is visually identifiable and differential from the body temperature probe 30 because it has a fixation band 43 configured to fix the peripheral temperature sensor to an infant's extremity, or limb, such as to an infant's hand, foot, wrist, ankle, or the like. The fixation band 43 is sized such that it does not permit fixation of the peripheral temperature sensor 41 to the infant's core, thereby visually instructing the clinician to attach the peripheral temperature probe 40 to the infant's extremity and preventing confusion between the peripheral temperature probe 40 and the body temperature probe 30. Similarly, the connection pad 33 may be sized and configured to be adhered to the infant's torso and make it difficult to adhere the body temperature sensor 31 to the infant's extremity. For example, the connection pad 33 may be relatively large in size such that it does not fit on the infant's hand or foot and may also be relatively stiff such that it cannot be wrapped around the infant's hand or foot.

The fixation band 43 may be any band configured to or capable of wrapping around the infant's extremity in order to force thermal contact between the peripheral temperature sensor and the infant's skin. In an exemplary embodiment, the fixation band 43 may be an elastic band sized and stretchable to fit around infant hands and feet of various sizes. Alternatively, the fixation band 43 may be a Velcro strap or an adhesive strap, or other self-adhering materials that can be wrapped around a location on the infant's extremity. In still other embodiments, the fixation band 43 may include a buckle 45, or clasp, or connector, that can be used to size the fixation band 43 appropriately for the infant. The fixation band 43 may have a heat reflective outer surface 44 that insulates the peripheral temperature sensor 41 from heat sources external to the infant 1. Thus, the peripheral temperature sensor 41 senses the temperature of the infant's skin, rather than absorbing heat from external sources, such as heat generated by the heater system 20. For example, the heat reflective outer surface may be a heat-reflective fabric, such as a thin, flexible, aluminized fiberglass cloth, or any fabric with an infrared-reflective outer layer comprising gold, silver, or aluminum.

Figure 5:
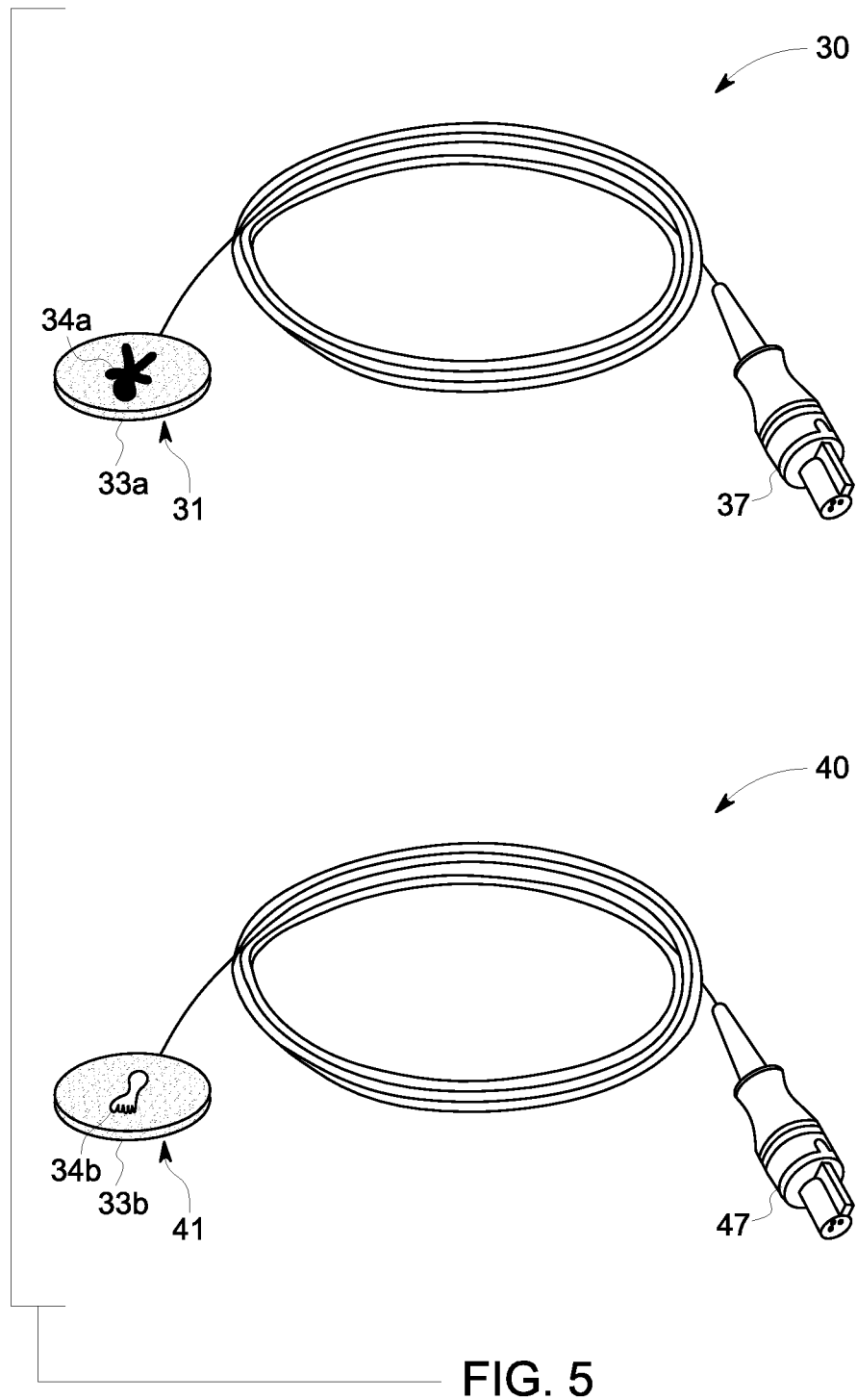

In other embodiments, the body temperature probe 30 and peripheral temperature probe 40 may be visually distinguishable by other means, such as labels, tags, color indicators, or the like. FIG. 5 depicts one embodiment where the body temperature probe 30 and peripheral temperature probe 40 both have a connection pad 33a, 33b fixing the respective temperature sensors 31, 41 to the infant. In the illustrative embodiment of FIG. 5, the temperature probes 30 and 40 are differentiable based on an indicator graphic 34a and 34b thereon. The connection pad 33a of the body temperature probe 30 has a probe-type indicator graphic 34a showing a stick figure, while the connection pad 33b of the peripheral temperature probe 40 has a probe-type indicator graphic 34b of a foot, indicating the locations for adhering the respective connection pads 33a, 33b. Alternatively or additionally, the connection pads 33a and 33b may be sized differently, such as by making the connection pad 33a significantly larger than the connection pads 33b. In such an embodiment, a clinician would be dissuaded from adhering the connection pad 33a of the body temperature probe 30 to an infant's hand or foot because the connection pad 33a is too large.

Figure 6:
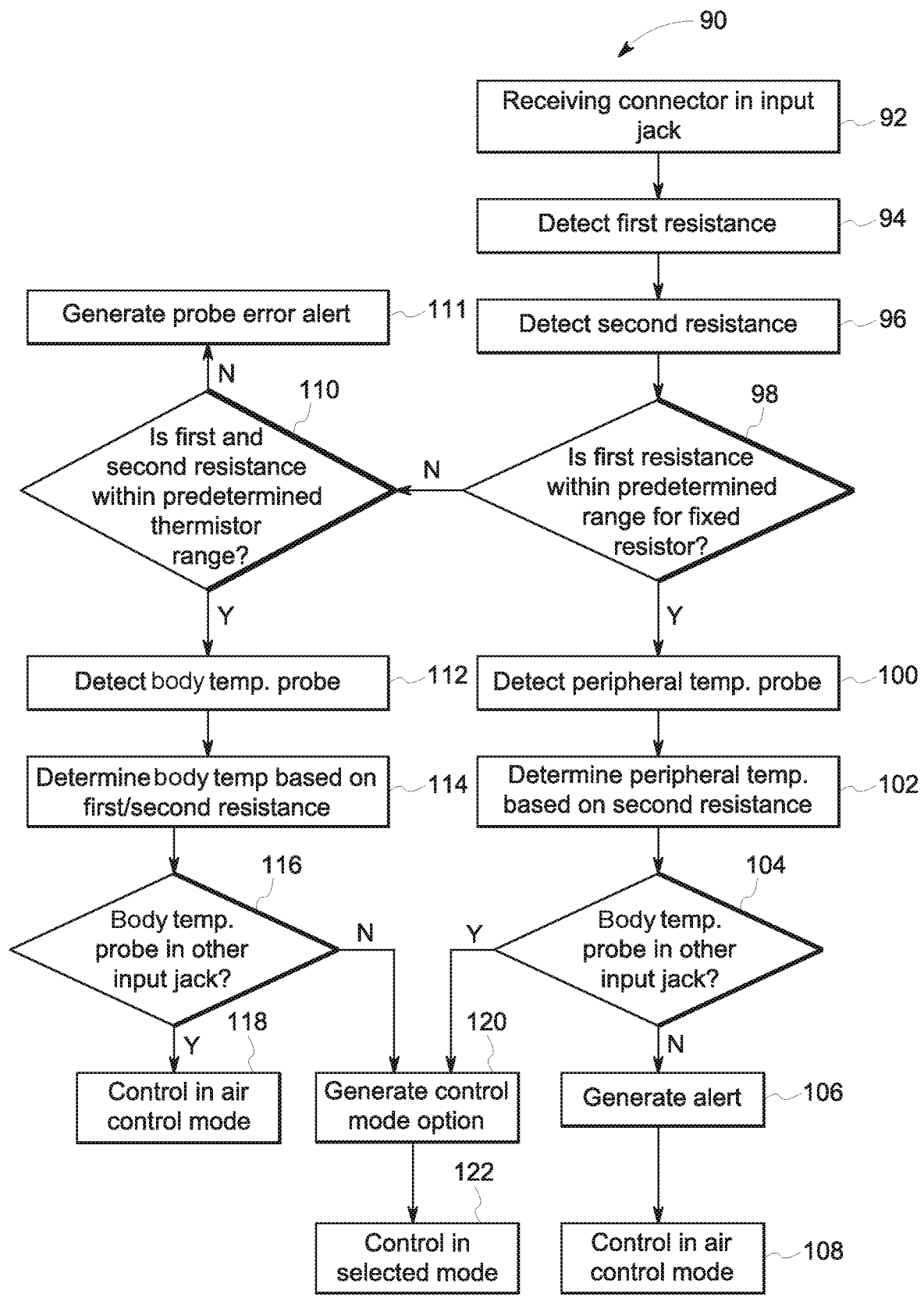
FIGS. 6 and 7 are flow charts depicting exemplary methods of operating an infant warming system according to embodiments of the present disclosure.

FIG. 6 depicts one embodiment of a method 90 of operating an infant warming system 10. As described above, the infant warming system has two identical input jacks 50a and 50b, wherein each of the input jacks 50a, 50b are configured to alternatively receive either of the connector 37 of the body temperature probe 30 or the connector 47 of the peripheral temperature probe 40. The method 90 includes receiving a connector 37, 47 in one of the input jacks 50a, 50b at step 92. A first resistance is detected at step 94 and a second resistance is detected at step 96. Instructions are executed at step 98 to determine whether one of the resistances is within a predetermined range for the fixed resistor. In the depicted example, the first resistance is assumed to be the location where the fixed resistor resides if the temperature probe is a peripheral temperature probe 40. Thus, if the first resistance is within the predetermined range for the fixed resistor, a peripheral temperature probe 40 is detected at step 100. In other embodiments, such as where the connector is symmetrical, the possible location of the fixed resistor $R_F$ may not be known. In such embodiments, the resistances of both resistors may be examined to determine if the fixed resistor is present.

Assuming that the fixed resistor $R_F$ is detected, a peripheral temperature is then determined at step 102 based on the second resistance (the other measured resistance from the peripheral temperature sensor 41). Step 104 is executed to determine whether a body temperature probe is already detected as being connected to the other input jack 50a, 50b. If not, then an alert is generated at step 106 to alert the user that no body temperature probe is detected. For example, a visual alert may be generated on the display 24 notifying the clinician that no body temperature probe 30 has been detected. The heater system 20 is then controlled in air control mode, represented at step 108, since no body temperature probe 30 is detected. If a body temperature probe is detected, and thus the inquiry at step 104 is affirmative, a control mode option may be generated at step 120, such as providing an option on a user interface, such as on a touchscreen display 24, allowing the clinician to select between air control mode and infant control mode as described above. The heater system 20 is then controlled at step 122 according to the rules of the selected control mode.

Returning to step 98, if the first resistance is not within the predetermined range for the fixed resistor, then the system 10, such as according to instructions comprising the probe detection module 26, determines that the connector is not associated with a peripheral temperature probe 40. At that point the connected probe may be determined to be a body temperature probe 30. Alternatively or additionally, steps may be executed to verify that the connector is indeed associated with a properly-functioning body temperature probe 30. For example, instructions may be executed at step 110 to determine whether the first and second resistance values are within a predetermined resistance range for the thermistors $T_1$ and $T_2$. If not, then a probe error alert may be generated at step 111. If the received resistance values are within the predetermined resistance range for the thermistors, then the connected probe may be verified as a body temperature probe 30, represented at step 112.

A body temperature may then be determined at step 110 based on the first and/or second resistances. As described above, two body temperatures may be determined, one for each of the resistance values. Instructions are then executed at step 116 to determine whether a body temperature probe has been detected at the other input jack 50a, 50b. If two body temperature probes are detected, then the heater system 20 is controlled in air control mode at step 118. If two body temperature probes are not detected, then the control mode option may be generated at step 120, as is described above. Accordingly, the clinician is provided an option to control the heater system 20 in infant control mode when either a single temperature probe 30 is detected, or a body temperature probe 30 and a peripheral temperature probe 40 are detected.

Figure 7:
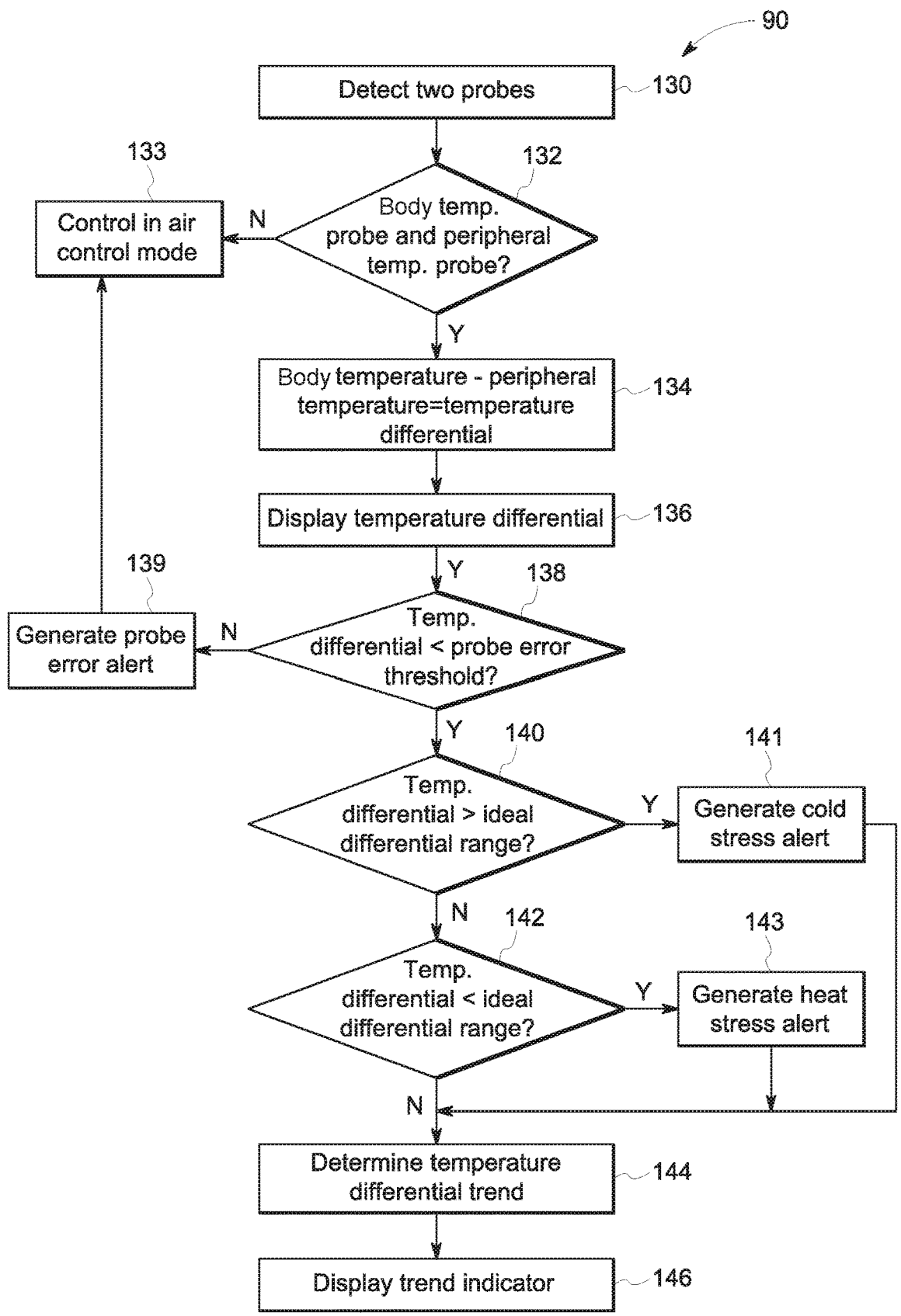

FIG. 7 depicts additional exemplary steps that may be included in the method 90 of operating the infant warming system 10. If two temperature probes are detected at step 130, one temperature probe connected to each input jack 50a and 50b, then instructions are executed at step 132 to determine whether the two temperature probes include one body temperature probe 30 and one peripheral temperature probe 40. If not, then the heater system 20 is controlled according to the air mode control at step 133, as is discussed above with respect to steps 108 and 118. If both a body temperature probe 30 and a peripheral temperature probe 40 are present, then a temperature differential is determined at step 134 by subtracting the peripheral temperature from the body temperature. The temperature differential is displayed at step 136, such as on the display 24 associated with the system 10. Instructions are executed at step 138 to determine whether the temperature differential is less than a probe error threshold indicating probe misplacement (e.g. that the body temperature probe 30 is placed on the infant's extremity). If the temperature differential is less than the probe error threshold (e.g. the peripheral temperature measurement is greater than or equal to the body temperature measurement) then a probe error alert is generated at step 139. Steps may then be executed to ensure that the heater system 20 is not erroneously controlled, such as by requiring control in the air control mode.

Assuming that the temperature differential is not less than the probe error threshold, instructions may be executed to determine whether the temperature differential is within the ideal differential range. If the temperature differential is above the ideal differential range at step 140, then a cold stress alert is generated at step 141. If the temperature differential is below the ideal differential range at step 142, then a heat stress alert is generated at step 143. A temperature differential trend is determined at step 144, such as based on the temperature differential over a most recent period of time or number of temperature measurements. A trend indicator is then generated and displayed at step 146 based on the temperature differential trend.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A method of operating an infant warming system having a first input jack and a second input jack, wherein each of the first input jack or the second input jack is configured to alternatively receive a connector of a peripheral temperature probe and a connector of a body temperature probe, the method comprising:
    receiving a connector of a first temperature probe in the first input jack;
    determining a first resistance and a second resistance for the first temperature probe;
    comparing at least one of the first resistance and the second resistance to a predetermined range of a fixed resistance value;
    determining that the first temperature probe is the peripheral temperature probe when one of the first resistance or the second resistance is within the predetermined range of the fixed resistance value;
    provided that the first temperature probe is determined to be the peripheral temperature probe, determining a peripheral temperature measurement for the infant based on the remaining one of the first resistance or the second resistance that is not within the predetermined range of the fixed resistance value; and
    determining that the first temperature probe is the body temperature probe when neither of the first resistance or the second resistance is within the predetermined range of the fixed resistance value.

2. The method of claim 1, further comprising:
    receiving connection of a connector of a second temperature probe in the second input jack, wherein the second input jack is identical to the first input jack and is configured to alternatively receive the connector of the peripheral temperature probe or the connector of the body temperature probe;
    determining a first resistance and a second resistance for the second temperature probe;
    determining that the second temperature probe is a body temperature probe based on the first resistance and the second resistance; and
    provided that the second temperature probe is determined to be the body temperature probe, determining a body temperature for the infant based on at least one of the first resistance and the second resistance.

3. The method of claim 2, further comprising:
    comparing the body temperature to the peripheral temperature to verify that the body temperature is greater than the peripheral temperature by at least a probe error threshold;
    generating a probe error alert if the body temperature is not greater than the peripheral temperature by at least the probe error threshold; and
    provided that the body temperature is not greater than the peripheral temperature by at least the probe error threshold, preventing control of an air temperature based on either of the peripheral temperature measurement or the body temperature measurement.

4. The method of claim 2, further comprising:
upon detecting both the peripheral temperature probe and the body temperature probe, prompting a user to choose between an infant control mode where a heater system is controlled based on the body temperature, and an air control mode where the heater system is controlled based on an air temperature.

5. The method of claim 2, further comprising:
determining a temperature differential between the body temperature measurement for the infant and the peripheral temperature measurement; and
displaying the temperature differential on a display.

6. The method of claim 5, further comprising:
comparing the temperature differential to an ideal temperature differential range; and
generating a heat stress alert if the temperature differential is below the ideal temperature differential range and generating a cold stress alert if the temperature differential is above the ideal temperature differential range.

7. The method of claim 5, further comprising:
determining a temperature differential trend based on the temperature differential over time; and
displaying a trend indicator on a display indicating the temperature differential trend.

8. A method of operating an infant warming system having a first input jack and a second input jack, wherein each of the first input jack or the second input jack is configured to alternatively receive a connector of a peripheral temperature probe and a connector of a body temperature probe, the method comprising:
receiving a connector of a first temperature probe in the first input jack;
determining a first resistance and a second resistance for the first temperature probe;
distinguishing whether the first temperature probe is the peripheral temperature probe or the body temperature probe based on the first resistance and the second resistance, including comparing at least one of the first resistance and the second resistance to a predetermined range of a fixed resistance value, determining that the first temperature probe is the peripheral temperature probe if one of the first resistance or the second resistance is within the predetermined range, and determining that the first temperature probe is a body temperature probe if the first resistance is not within the predetermined range; and
determining a temperature for an infant based on temperature measurements from the first temperature probe and based on whether the first temperature probe is the peripheral temperature probe or the body temperature probe.

9. The method of claim 8, wherein the predetermined range is between a predetermined amount greater than and a predetermined amount less than the fixed resistance value.

10. The method of claim 8, further comprising:
receiving connection of a connector of a second temperature probe in the second input jack, wherein the second input jack is identical to the first input jack and is configured to alternatively receive the connector of the peripheral temperature probe or the connector of the body temperature probe;
determining a first resistance and a second resistance for the second temperature probe;
determining that the second temperature probe is a body temperature probe based on the first resistance and the second resistance of the second temperature probe; and
determining a body temperature for the infant based on at least one of the first resistance and the second resistance of the second temperature probe.

11. The method of claim 10, further comprising:
if the first temperature probe is also determined to be a body temperature probe, automatically determining a body temperature for a first infant based on the first temperature probe and determining a body temperature for a second infant based on the second temperature probe, and then displaying the body temperatures for the first and second infants; and
if the first temperature probe is determined to be a peripheral temperature probe, automatically determining a peripheral temperature for the first infant based on the first temperature probe and determining a temperature differential between the body temperature for the infant and the peripheral temperature measurement, and then displaying the temperature differential on the display.

12. The method of claim 10, wherein the first temperature probe is determined to be a peripheral temperature probe, and further comprising:
automatically determining a temperature differential between the body temperature measurement for the infant and the peripheral temperature measurement;
comparing the temperature differential to an ideal differential range; and
generating a heat stress alert if the temperature differential is below the ideal differential range and generating a cold stress alert if the temperature differential is above the ideal differential range.

13. The method of claim 10, further comprising:
determining a temperature differential trend based on the temperature differential over time; and
displaying a trend indicator on a display indicated the temperature differential trend.

14. The method of claim 8, further comprising:
detecting both the peripheral temperature probe and the body temperature probe, one in each of the first input jack and the second input jack; and
prompting a user to choose between an infant control mode where a heater system is controlled based on the body temperature probe measurements, and an air control mode where the heater system is controlled based on an air temperature.

15. The method of claim 8, further comprising detecting each of the peripheral temperature probe and the body temperature probe and then prompting a user to choose between an infant control mode where a heater system is controlled based on the body temperature and an air control mode where the heater system is controlled based on an air temperature.

16. The method of claim 8, further comprising detecting two body temperature probes and then preventing control of an air temperature based on temperature measurements from the body temperature probes and automatically engaging the air control mode.

17. The method of claim 8, further comprising detecting two peripheral temperature probes and then automatically generating a probe error alert, preventing control of an air temperature based on temperature measurements from the peripheral temperature probes, and automatically engaging the air control mode.

* * * * *